United States Patent
Atallah et al.

(10) Patent No.: US 9,685,851 B2
(45) Date of Patent: Jun. 20, 2017

(54) MAGNETIC DRIVE SYSTEMS

(75) Inventors: Kais Atallah, Sheffield (GB); Jan Jozef Rens, Sheffield (GB)

(73) Assignee: Magnomatics Limited, Sheffield (GB)

( * ) Notice: Subject to any disclaimer, the term of this patent is extended or adjusted under 35 U.S.C. 154(b) by 932 days.

(21) Appl. No.: 12/812,526

(22) PCT Filed: Jan. 12, 2009

(86) PCT No.: PCT/GB2009/000079
§ 371 (c)(1),
(2), (4) Date: Sep. 15, 2010

(87) PCT Pub. No.: WO2009/087408
PCT Pub. Date: Jul. 16, 2009

(65) Prior Publication Data
US 2011/0012458 A1   Jan. 20, 2011

(30) Foreign Application Priority Data

Jan. 11, 2008 (GB) .................................. 0800463.2

(51) Int. Cl.
| H02K 49/10 | (2006.01) |
| H02K 51/00 | (2006.01) |
| H02K 49/06 | (2006.01) |

(52) U.S. Cl.
CPC .......... *H02K 49/102* (2013.01); *H02K 51/00* (2013.01); *H02K 49/06* (2013.01); *H02K 49/10* (2013.01)

(58) Field of Classification Search
CPC ...... H02K 49/06; H02K 49/10; H02K 49/102; H02K 51/00

USPC ....... 310/103, 112, 92, 83, 100, 101, 102 A, 310/102 R, 114, 155.37, 216.093, 310/216.114; 74/DIG. 4
IPC ..................................................... H02K 49/10
See application file for complete search history.

(56) References Cited

U.S. PATENT DOCUMENTS

| 2,722,617 | A | | 11/1955 | Cluwen et al. |
| 3,378,710 | A | | 4/1968 | Martin, Jr. |
| 3,730,488 | A | * | 5/1973 | Gardner, Jr. .................. 366/262 |
| 4,021,691 | A | * | 5/1977 | Dukshtau et al. ...... 310/216.114 |
| 5,013,949 | A | * | 5/1991 | Mabe, Jr. ............. H02K 49/102 310/103 |

(Continued)

FOREIGN PATENT DOCUMENTS

| EP | 1353436 | | 10/2003 |
| WO | WO9622630 | * | 7/1996 |

OTHER PUBLICATIONS

Atallah et al., "A Novel High-Performance Magnetic Gear", IEEE Transactions on Magnetics, Jul. 2001, 37(4), 2844-2846.

(Continued)

*Primary Examiner* — John K Kim
(74) *Attorney, Agent, or Firm* — Baker & Hostetler LLP

(57) ABSTRACT

A magnetic drive system comprising three members, a first and second of which form an input member and an output member each arranged to rotate relative to the third member, wherein two of the members have respective sets of permanent magnets, the two sets having different numbers of magnetic poles, and the other of the members comprises a cylindrical body having a plurality of pole pieces embedded therein, the pole pieces being arranged to modulate the magnetic field acting between the magnets, and wherein one of the pole pieces is of varying radial thickness.

34 Claims, 16 Drawing Sheets

(56) References Cited

U.S. PATENT DOCUMENTS

| | | | | |
|---|---|---|---|---|
| 5,569,111 | A * | 10/1996 | Cho | H02K 49/102 310/103 |
| 5,569,967 | A * | 10/1996 | Rode | 310/103 |
| 5,633,555 | A * | 5/1997 | Ackermann | H02K 49/102 310/103 |
| 5,994,809 | A * | 11/1999 | Ackermann | H02K 49/102 310/103 |
| 7,471,024 | B2 * | 12/2008 | Park | 310/103 |
| 7,549,467 | B2 * | 6/2009 | McDonald | H02K 49/102 166/105 |
| 7,791,235 | B2 * | 9/2010 | Kern | F01D 15/10 310/103 |
| 7,973,441 | B2 * | 7/2011 | Atallah | H02K 49/102 310/103 |
| 2003/0062784 | A1 * | 4/2003 | Arimitsu et al. | 310/112 |
| 2004/0021384 | A1 * | 2/2004 | Six | H02K 49/106 310/103 |
| 2004/0108781 | A1 * | 6/2004 | Razzell | H02K 7/11 310/112 |
| 2004/0145252 | A1 * | 7/2004 | Arimitsu et al. | 310/58 |
| 2005/0052091 | A1 * | 3/2005 | Arimitsu et al. | 310/266 |
| 2006/0175923 | A1 * | 8/2006 | Abou Akar et al. | 310/114 |
| 2007/0125578 | A1 * | 6/2007 | McDonald et al. | 175/107 |
| 2007/0215343 | A1 * | 9/2007 | McDonald | H02K 49/102 166/105 |
| 2007/0278892 | A1 * | 12/2007 | Lee | 310/217 |
| 2008/0149445 | A1 * | 6/2008 | Kern et al. | 192/3.56 |
| 2008/0211335 | A1 * | 9/2008 | Abe | H02K 16/02 310/103 |
| 2011/0012458 | A1 * | 1/2011 | Atallah | H02K 49/102 310/103 |

OTHER PUBLICATIONS

Atallah et al., "Design, Analysis and Realisation of a High Performance Magnetic Gear", IEEE Proceedings-Electric Power Applications, 2004, 151, 135-143.

* cited by examiner

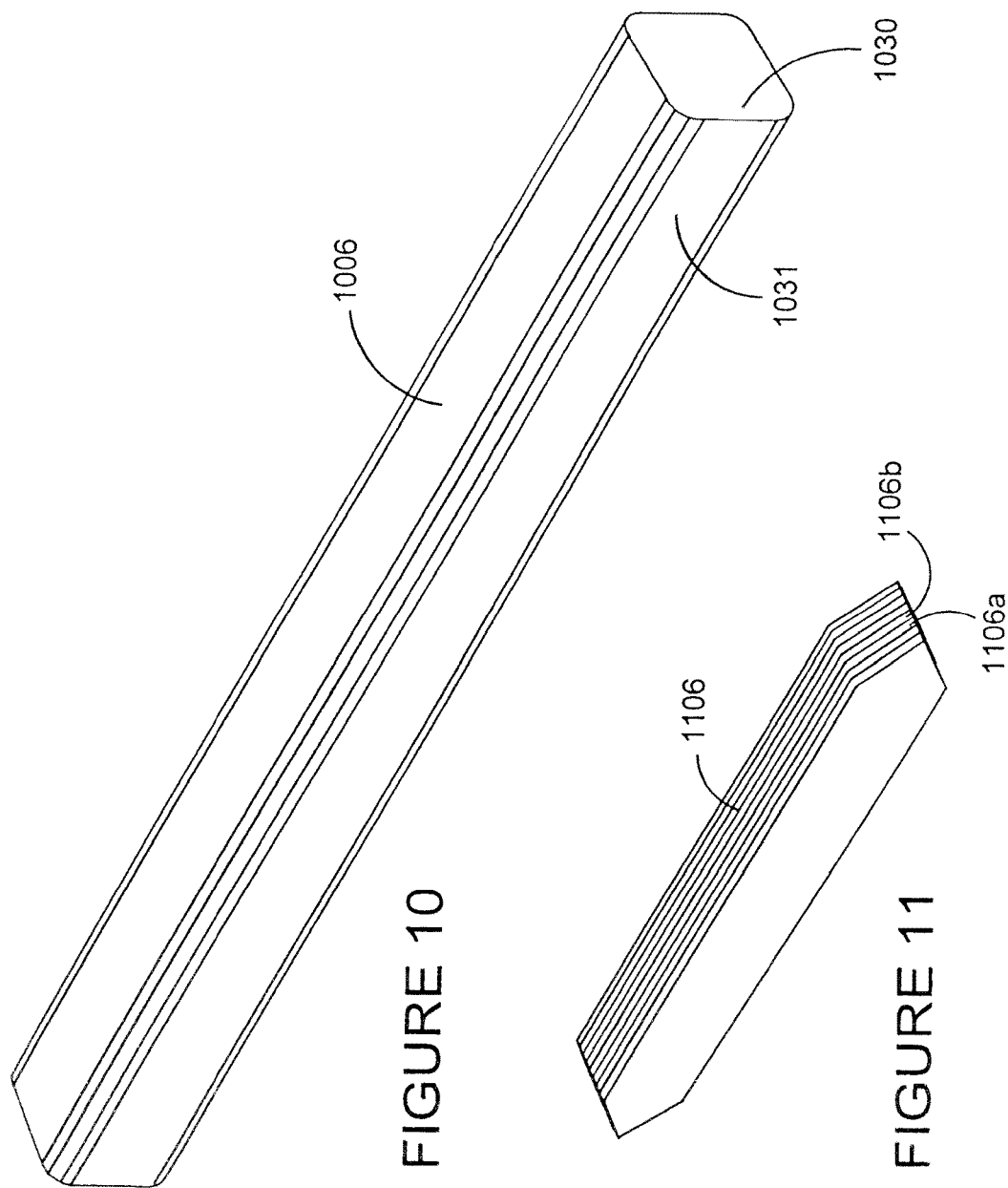

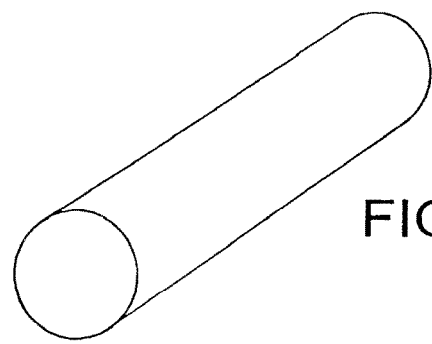
FIGURE 25
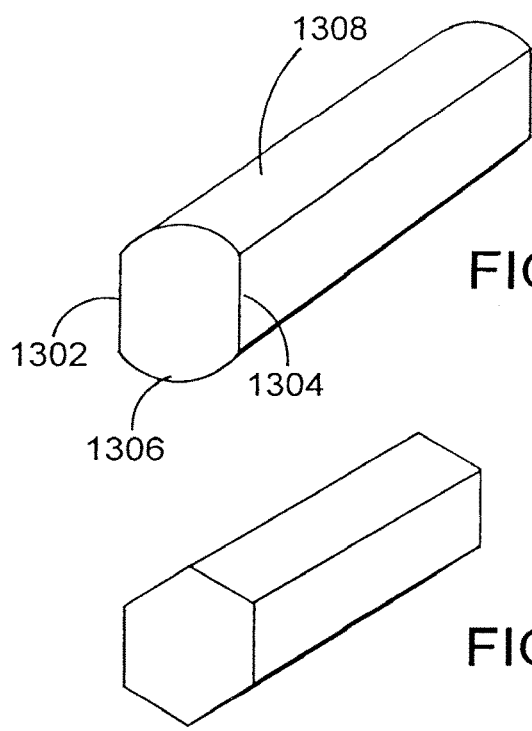
FIGURE 26
FIGURE 27
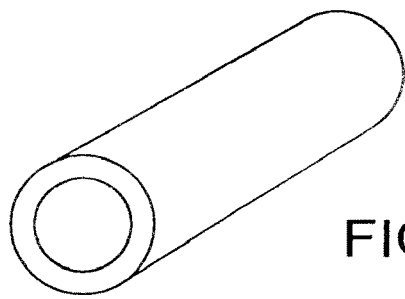
FIGURE 28

US 9,685,851 B2

MAGNETIC DRIVE SYSTEMS

FIELD OF THE INVENTION

The present invention relates to magnetic drive systems, and in particular to the design and support of ferromagnetic pole pieces within such systems.

BACKGROUND TO THE INVENTION

Magnetic drive couplings are known in which input and output rotors are provided with respective sets of permanent magnets, and a set of ferromagnetic pole pieces is arranged between the 'rotors to modulate the magnetic field, such that the output rotor is driven at a different speed to the input rotor, providing a geared coupling. In a variation of such systems, the pole pieces are mounted on one of the rotors and one set of permanent magnets is fixed.

SUMMARY OF INVENTION

The present invention provides a magnetic drive system comprising three members, a first and second of which form an input member and an output member each arranged to rotate relative to the third member, wherein two of the members have respective sets of permanent magnets, the two sets having different numbers of magnetic poles, and the other of the members comprises a cylindrical body having a plurality of pole pieces embedded therein, the pole pieces being arranged to modulate the magnetic field acting between the magnets, and wherein one of the pole pieces comprises a main portion and a retaining portion, the retaining portion being narrower in the radial direction than the main portion.

The radially inner and outer surfaces of the main portion may be mutually parallel. The radially inner and outer surfaces of the retaining portion may be mutually parallel or they may be non-parallel, for example so that the retaining portion tapers in a direction away from the main portion.

The pole piece may be of constant cross section in one direction, and may be laminar being formed from a plurality of sheets all of the same shape.

The present invention further provides a magnetic drive system comprising three members, a first and second of which form an input member and an output member each arranged to rotate relative to the third member, wherein two of the members have respective sets of permanent magnets, the two sets having different numbers of magnetic poles, and the other of the members comprises a cylindrical body having a plurality of pole pieces embedded therein, the pole pieces being arranged to modulate the magnetic field acting between the magnets, an end support at each end of the cylindrical body, and a plurality of stiffening bars extending axially along the cylindrical body between the end supports.

The present invention further provides a magnetic drive system comprising three members, a first and second of which form an input member and an output member each arranged to rotate relative to the third member, wherein two of the members have respective sets of permanent magnets, the two sets having different numbers of magnetic poles, and a third one of the members comprises a cylindrical body having a plurality of pole pieces embedded therein, the pole pieces being arranged to modulate the magnetic field acting between the magnets, and a support connected to the pole pieces.

The support may be annular and may connect together all of the pole pieces. The support may be at one axial end of the pole pieces. Alternatively it may be located part way along the pole pieces.

Preferred embodiments of the present invention will now be described by way of example only with reference to the accompanying drawings.

BRIEF DESCRIPTION OF THE DRAWINGS

FIGS. 6 to 17 are perspective views of pole pieces forming part of drive couplings according to further embodiments of the invention;

FIGS. 25 to 28 are perspective views of pole pieces forming part of drive couplings according to further embodiments of the invention.

DESCRIPTION OF THE PREFERRED EMBODIMENTS

Figure 1:
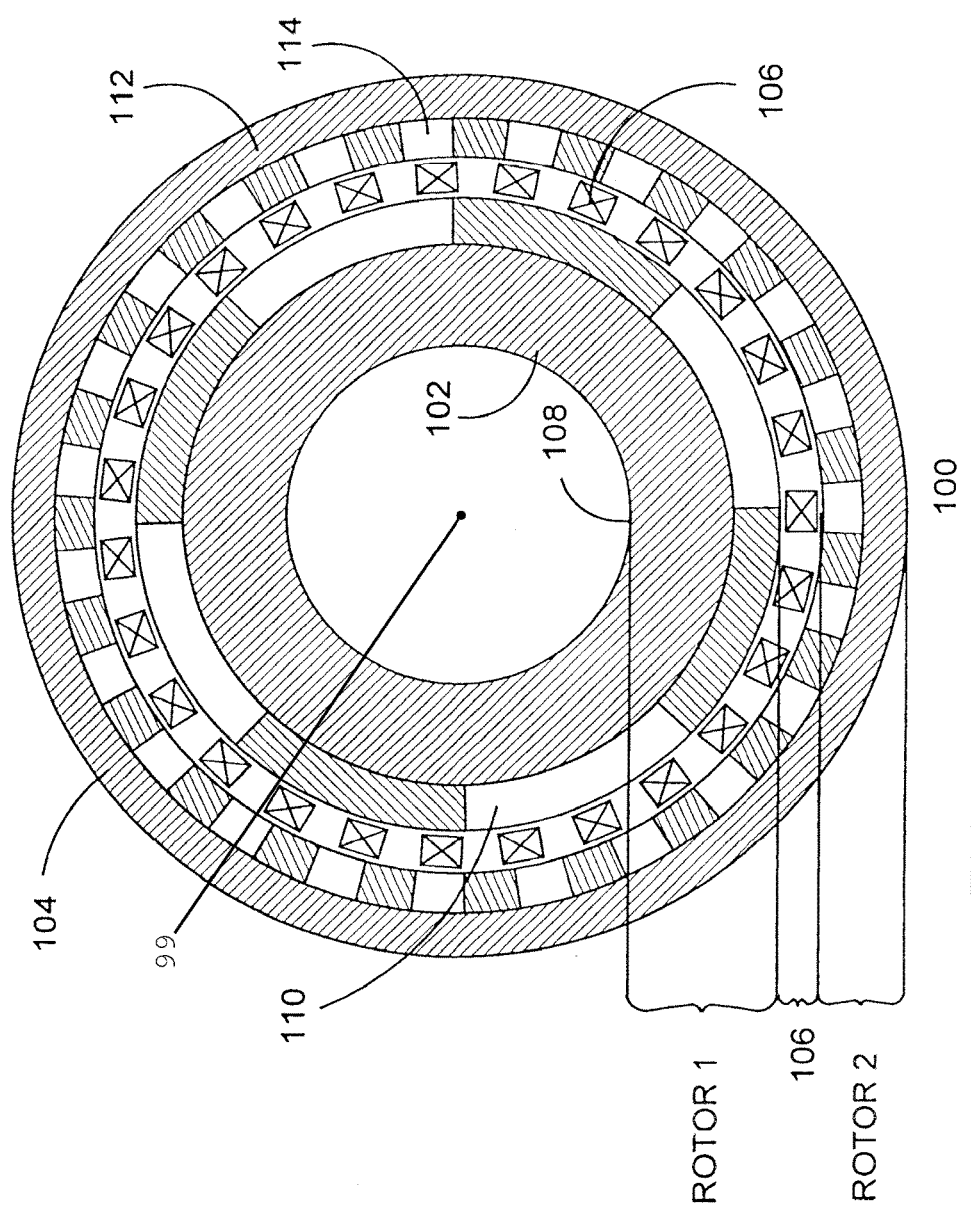
FIG. 1 is a schematic section through a rotary magnetic gearing system used in the present invention.

Referring to FIG. 1, a rotary magnetic gear 100 comprises a first or inner rotor 102, a second or outer rotor 104 having a common axis of rotation 99 with the first rotor 102, and a number of pole pieces 106 of ferromagnetic material. The first rotor 102 comprises a support 108 carrying a first set of permanent magnets 110, arranged with their north and south poles at their radially inner and outer ends, and orientated with alternating polarity so that each of the magnets 110 has its poles facing in the opposite direction to the magnets on either side of it. In this embodiment, the first rotor 102 comprises eight permanent magnets, or four pole-pairs, arranged to produce a spatially varying magnetic field. The second rotor 104 comprises a support 112 carrying a second set of permanent magnets 114, again arranged with their poles facing radially inwards and outwards, and with alternating polarity. The second rotor 104 comprises 46 permanent magnets or 23 pole-pairs arranged to produce a spatially varying field. The first and second sets of permanent magnets include different numbers of magnets. Accordingly, without any modulation of the magnetic fields they produce, there would be little or no useful magnetic coupling or interaction between the permanents magnets 110 and 114 such that rotation of one rotor would not cause rotation of the other rotor.

The pole pieces 106 are used to control the way in which the fields of the permanent magnets 110 and 114 interact. The pole pieces 106 modulate the magnetic fields of the permanent magnets 110 and 114 so that they interact to the extent that rotation of one rotor will induce rotation of the other rotor in a geared manner. The number of pole pieces is chosen to be equal to the sum of the number of pole-pairs of the two sets of permanent magnets. Rotation of the first rotor 102 at a speed $\omega_1$ will induce rotation of the second rotor 104 at a speed $\omega_2$ where $\omega_1 > \omega_2$. The ratio between the speeds of rotation $\omega_1$ and $\omega_2$, i.e. the gearing ratio of the coupling, is equal to the ratio between the numbers of magnets 110 and 114 on the first and second rotors 102, 104. The gear can operate in reverse, so that rotation of the second rotor 104 wall cause rotation of the first rotor at a higher speed.

Figure 2:
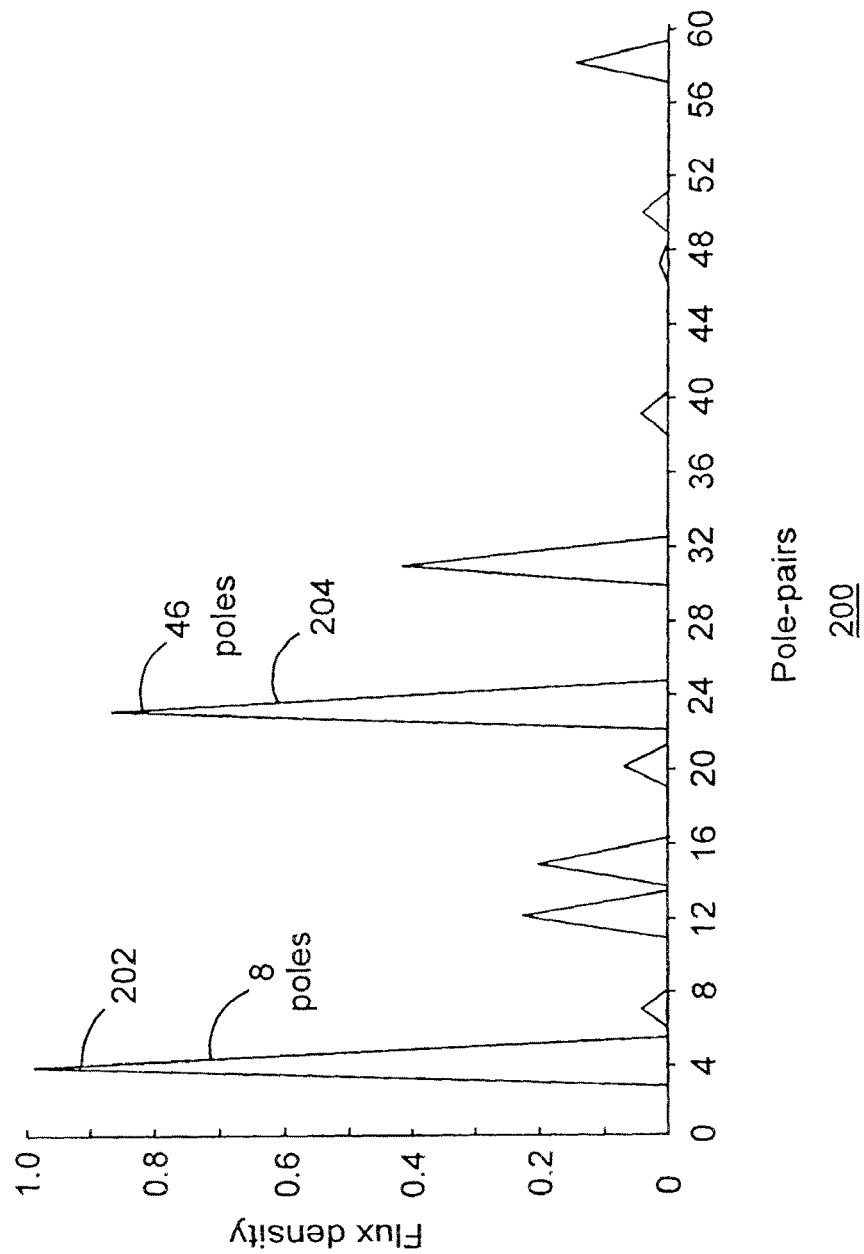
FIG. 2 is a graph illustrating magnetic spatial harmonics associated with the assembly of FIG. 1.

FIG. 2 shows a harmonic spectrum 200 of the spatial distribution of the magnetic flux density of the permanent magnets 110 mounted on the inner rotor 102 of the magnetic gear 100 of FIG. 1, in the air gap adjacent to the permanent magnets 114 mounted on the outer rotor 104. It can be appreciated that the spectrum 200 comprises a first or fundamental component 202 associated with the permanent magnets 110 of the first rotor 102. This is the component of the field of which the spatial frequency corresponds to the spatial frequency of the polarity of the magnets 110 and therefore corresponds to four pole-pairs. The pole pieces 106 modulate the magnetic field of the permanent magnets 110 to provide components of the magnetic field of different spatial frequencies corresponding to different numbers of pole pairs. For the permanent magnets 110, for example, this results in a relatively large asynchronous harmonic 204 having a number of pole pairs which is equal to the difference between the number of pole pieces 106 and the number of pole pairs of the magnets 110 on the inner rotor. This is arranged, by appropriate selection of the number of pole pieces 106, to be the same as the number of pole pairs of the permanent magnets 114 on the outer rotor 104, which enables coupling between the first 102 and the second 104 rotors. Also, with the pole pieces 106 held stationary and the inner rotor 102 rotated, this component of the field rotates at a lower speed than the inner rotor such that movement of one induces movement of the other, in a geared manner.

One skilled in the art understands how to select and design the pole pieces 106, given the first 110 and second 114 permanent magnets, to achieve the necessary magnetic circuit or coupling such that gearing between the first 102 and second 104 rotors results, as can be appreciated from, for example, K. Atallah, D. Howe, "A novel high-performance magnetic gear", IEEE Transactions on Magnetics, Vol. 37, No. 4, pp. 2844-2846, 2001 and K. Atallah, S. D. Calverley, D. Howe, "Design, analysis and realization of a high performance magnetic gear", IEE Proceedings—Electric Power Applications, Vol. 151, pp. 135-143, 2004.

Figure 3:
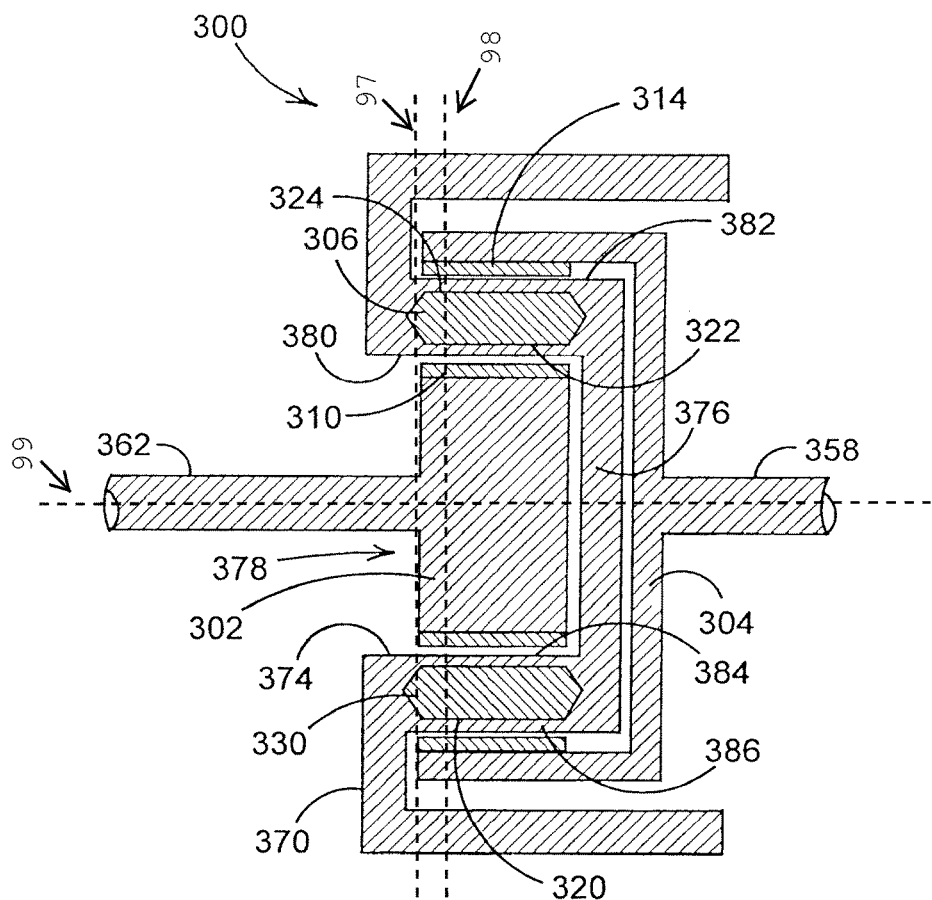
FIG. 3 is a longitudinal section through a drive coupling according to a first embodiment of the invention.

Referring to FIG. 3, a drive system 300 comprises an input rotor 302, which is driven by an electric motor via a drive shaft 362, and an output rotor 304 which is directly mechanically coupled to an output shaft 358. A fixed support 370 includes a cylindrical support portion 374 and an inner end wall 376. The cylindrical support portion 374 therefore surrounds a recess 378, in which the input rotor 302 is located. The output rotor 304 extends around the cylindrical portion 374, being radially outside it. Pole pieces 306 of the system are embedded within the cylindrical support portion 374, which extends between the input and output rotors 302, 304. Therefore the pole pieces 306 are below both the inner and outer surfaces 380, 382 of the cylindrical support portion 374, being completely enclosed within the material of the cylindrical support portion 374. The cylindrical support portion 374 is moulded, with the pole pieces 306 being moulded into it. This means that the outer surface 382 of the cylindrical support portion 374 is smooth. As the permanent magnets 314, which are on the radially inner side of the output rotor 304, are only spaced from the cylindrical wall portion 374 by a small distance, it is advantageous to have the surface of the cylindrical wall portion 374 smooth as this reduces losses due to turbulence in the fluid, which may be air or liquid, in the gap between the output rotor 304 and the cylindrical wall portion 374. The same is true for the radially inner surface 380 which needs to be smooth to reduce losses from fluid turbulence around the high speed rotor 302.

Figure 3A:
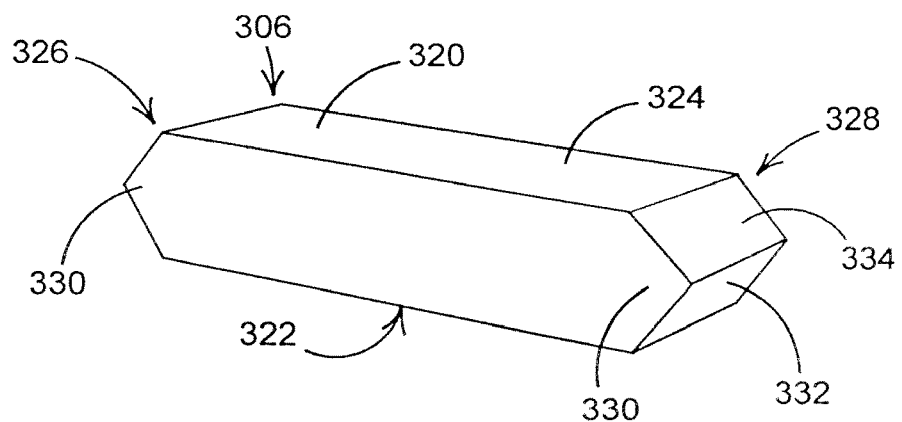
FIG. 3a is a perspective view of a pole piece of the coupling of FIG. 3.

Referring also to FIG. 3a, each of the pole pieces 306 comprises a main portion 320 having radially inner and outer surfaces 322, 324 which are mutually parallel and face radially inwardly and outwardly relative to the coupling axis. At each axial end 326, 328 of the main portion 320 there is a retaining portion 330, where the pole piece tapers towards the end, getting narrower in the radial direction. Specifically the retaining portion has a radially inner surface 332 and a radially outer surface 334. Each of these surfaces 332, 334 has one edge where it joins the respective surface 322, 324 of the main section 320, and one edge where these two surfaces 332, 334 meet at the axial extremity of the pole piece.

As can be seen in FIG. 3, the main portions 320 of the pole pieces 306, and hence their flat radially inner and outer surfaces 322, 324, are all the same length in the axial direction, and are also the same length in the axial direction as the permanent magnets 310 on the input rotor, and the same length as the permanent magnets. 314 on the output rotor. In other embodiments these lengths can be different. The two sets of magnets 310, 314 are aligned with each other in the axial direction and the main portions 320 of the pole pieces 306 are also aligned axially with the magnets 310, 314. The retaining portions 330 therefore extend axially beyond the axial ends of the magnets 310, 314.

It will be appreciated that, over most of the length of the pole pieces 306, and in particular over the whole of their flat radially inner and outer surfaces, the layers of material 384, 386 of the cylindrical body 374 that cover the pole pieces 306 on the radially inner and outer sides are relatively thin, and are therefore not able to provide a high level of support in the radial direction. Because of the radial forces acting on the pole pieces 306 as a result of magnetic fields in the system, the pole pieces tend to move radially as the rotors 302, 304 rotate. Because the retaining portions 330 are narrower in the radial direction than the main portion 320 of the pole pieces 306, while the inner and outer surfaces 380, 382 of the cylindrical body 374 are of constant radius of curvature, the thickness of moulded material in the cylindrical cylindrical body 374 on the inner and outer sides of the retaining portions 330 is greater, as measured along a first line 97 that extends perpendicular to the common axis 99 through the retaining portions 330, than the thickness, as measured along a second line 98 that extends perpendicular to the common axis 99 through the main portion 320, of material in the layers of material 384, 386 of the cylindrical body 374 that cover the main portion 320. Therefore the provision of the retaining portions results in a more secure support for the pole pieces, whilst allowing the layers 384, 386 of material over the main portion 320 to be kept relatively thin, which helps to ensure good magnetic coupling.

Figure 4:
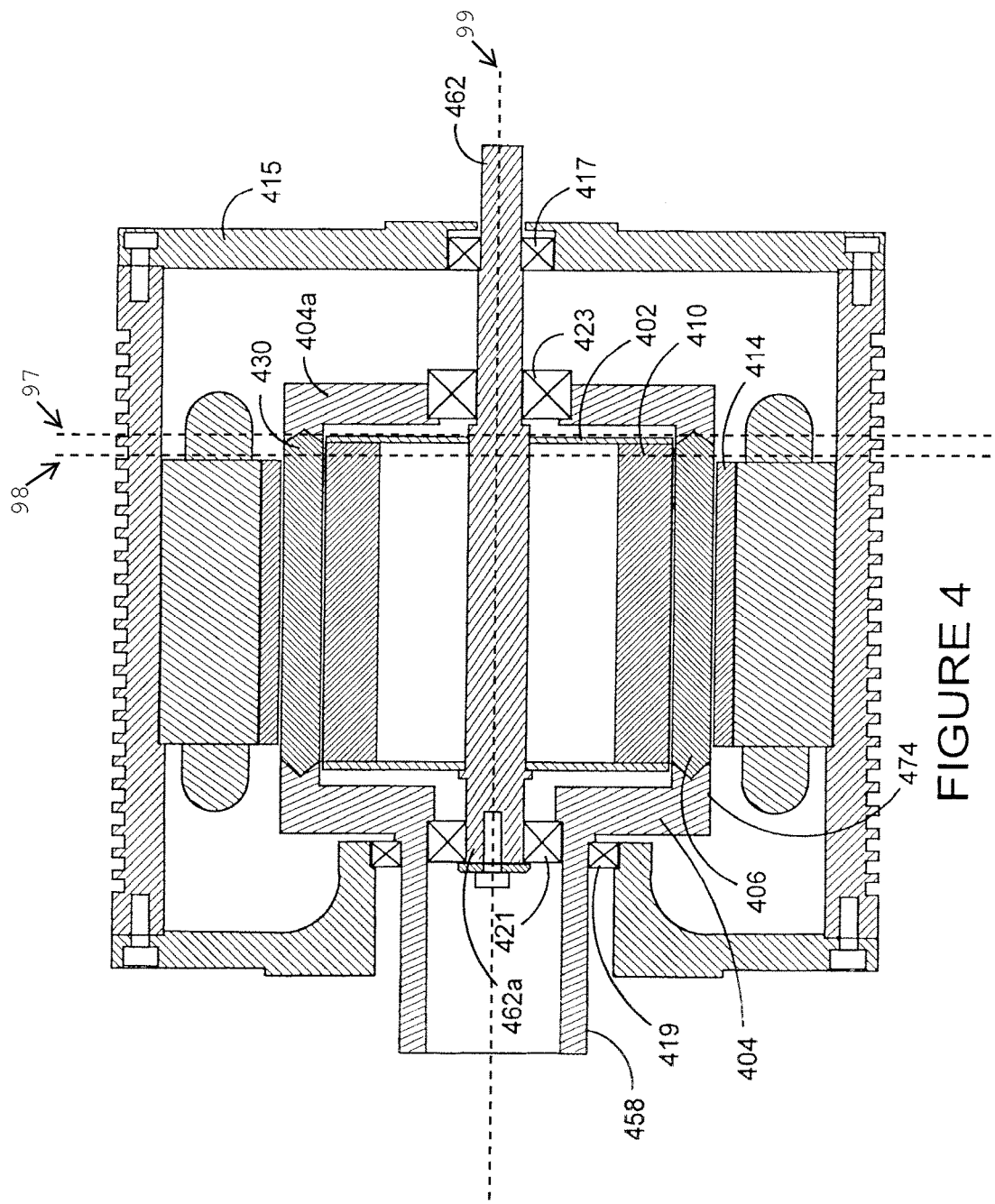
FIG. 4 is a longitudinal section through a drive coupling according to a second embodiment of the invention.

Referring to FIG. 4, in a second embodiment of the invention, the outer set of magnets 414 is fixed and mounted on a housing 415. The input rotor 402 has the inner set of magnets 410 mounted on it, and the output rotor 404 has the pole pieces 406 embedded in it, which again are located radially between the inner and outer sets of permanent magnets. The input rotor 402 is mounted on an input shaft 462, which extends out through the input end of the housing 415, being supported in the housing by a bearing 417. The output rotor 404 includes a cylindrical or tubular portion 474 that extends around the input rotor 402, and narrows to form a hollow output shaft 458 which extends out of the output end of 10 the housing 415, being supported in the housing by a bearing 419. The free end 462*a* of the input shaft is supported in a bearing 421 inside the hollow output shaft 458, and the free end 404*a* of the output rotor 404 is supported on the input shaft 462 by a further bearing 423. The interaction between the permanent magnets 410, 414 and the pole pieces 406 results in a geared coupling between the high speed input rotor 402 and the low speed output rotor 404.

As with first embodiment, the pole pieces 406 are moulded into the cylindrical support portion 474, which in this case forms part of the output rotor 404. The pole pieces 406 are shaped in the same way as those 306 in the first embodiment, with retaining portions 430 providing radial support for the pole pieces 306 within the cylindrical moulded plastics support portion 474.

Figure 5:
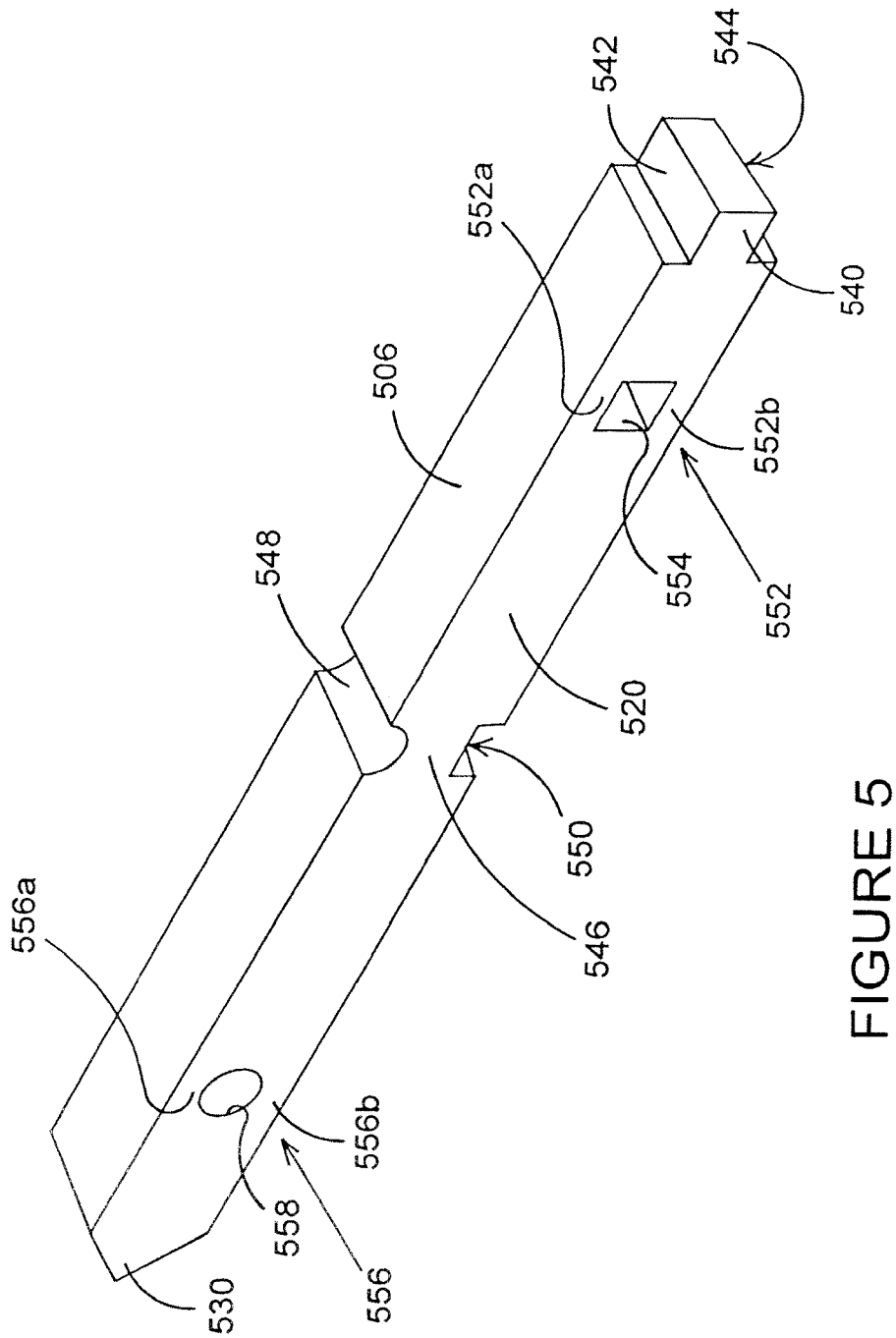
FIG. 5 is a perspective view of a pole piece including a number of different retaining portions which can be used in different embodiments of the invention.

Referring to FIG. 5, a pole piece 506 which can be used in couplings similar to that of FIG. 3 or FIG. 4 has a number of different retaining features. In practice these would not all be present in the same pole piece, but they are illustrated as such for brevity. At one axial end, the pole piece 506 has a tapered retaining portion 530 similar to that of the pole piece 360 of FIG. 3*a*. At the other axial end the pole piece has a further retaining portion 540 which is narrower than the main portion 520 in the radial direction (of the rotor in which the pole piece would be embedded), having radially inner and outer surfaces 542, 544 which are parallel to each other. These surfaces are recessed below the 30 parallel surfaces of the main portion 520. The retaining portion therefore forms a projection from the end of the pole piece 506 of uniform thickness, which is thinner than the main portion of the pole piece.

The pole piece 506 also comprises a third retaining portion 546 which is part way along the pole piece between its axial ends. This retaining portion 546 also comprises a narrowed portion with inner and outer surfaces 548, 550 which are recessed below the two surfaces of the main portion 520. However in this case, one of the surfaces 548 is curved, and the other 550 is flat. This therefore leaves two transverse grooves across the pole piece, one of rectangular cross section and one of semicircular cross section, that will be filled with moulded material when the pole piece is moulded into the cylindrical retaining portion, providing the desired radial support.

The pole piece 506 also comprises a fourth retaining portion 552, which can actually be considered as two separate retaining portions 552*a*, 552*b* formed on the radially inner and outer sides of an aperture 554 which extends transversely through the pole piece 506 (in the circumferential direction of the cylindrical support). Finally a fifth retaining portion 556, again in the form of a pair of retaining portions 556*a*, 556*b*, is formed on either side of a further transverse aperture 558 through the pole piece, which in this case is circular in cross section.

Figure 6:
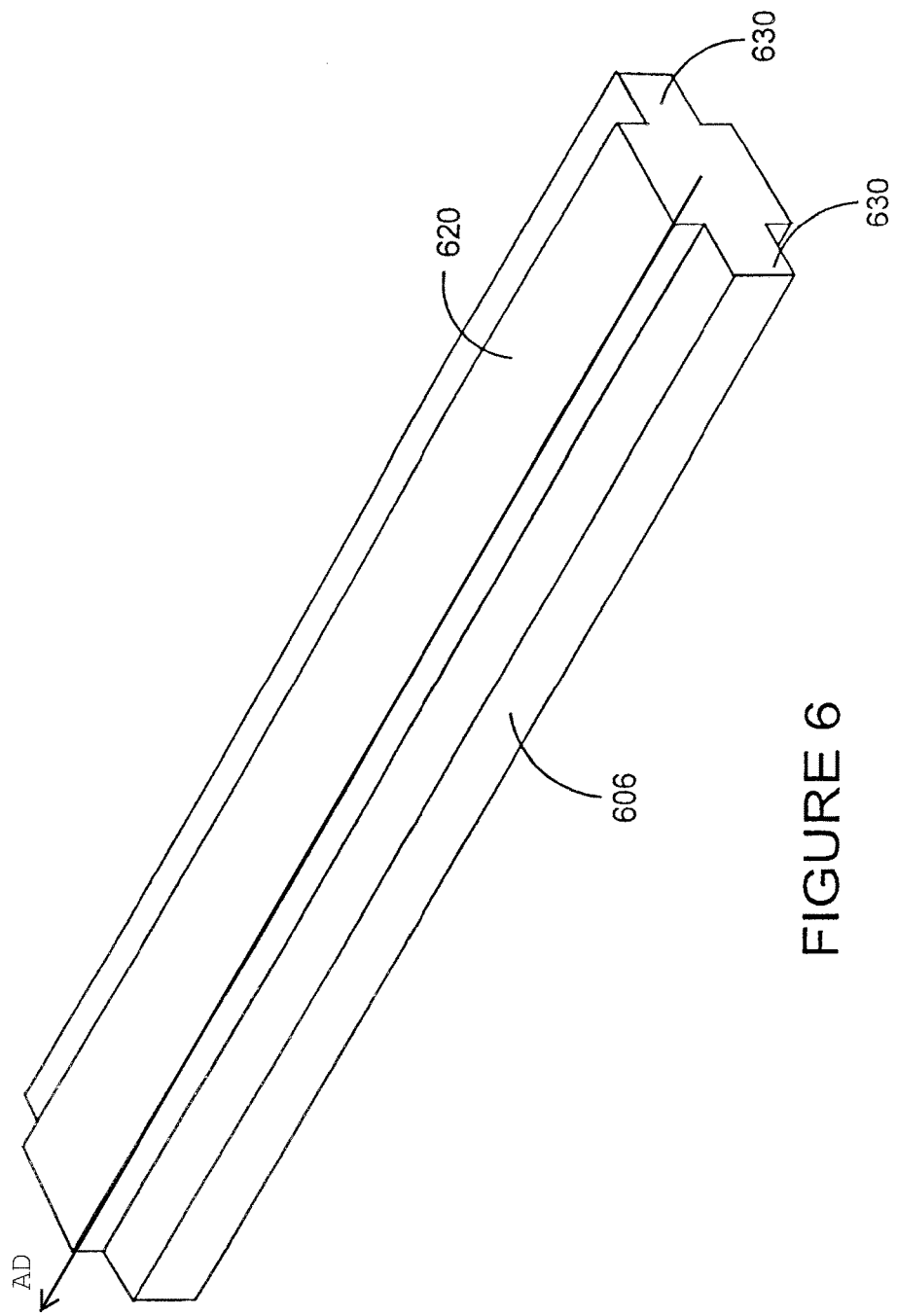

Referring to FIG. 6, a pole piece 606 forming part of a further embodiment of the invention is of constant cross section along its length in the axial direction AD, the cross section being generally cross-shaped. The pole piece therefore comprises a main portion 620 which is rectangular in cross section and extends the full length of the pole piece, and two retaining portions 630 extending along the sides of the pole piece and projecting in the circumferential direction (of the rotor) from the main portion.

Figure 7:
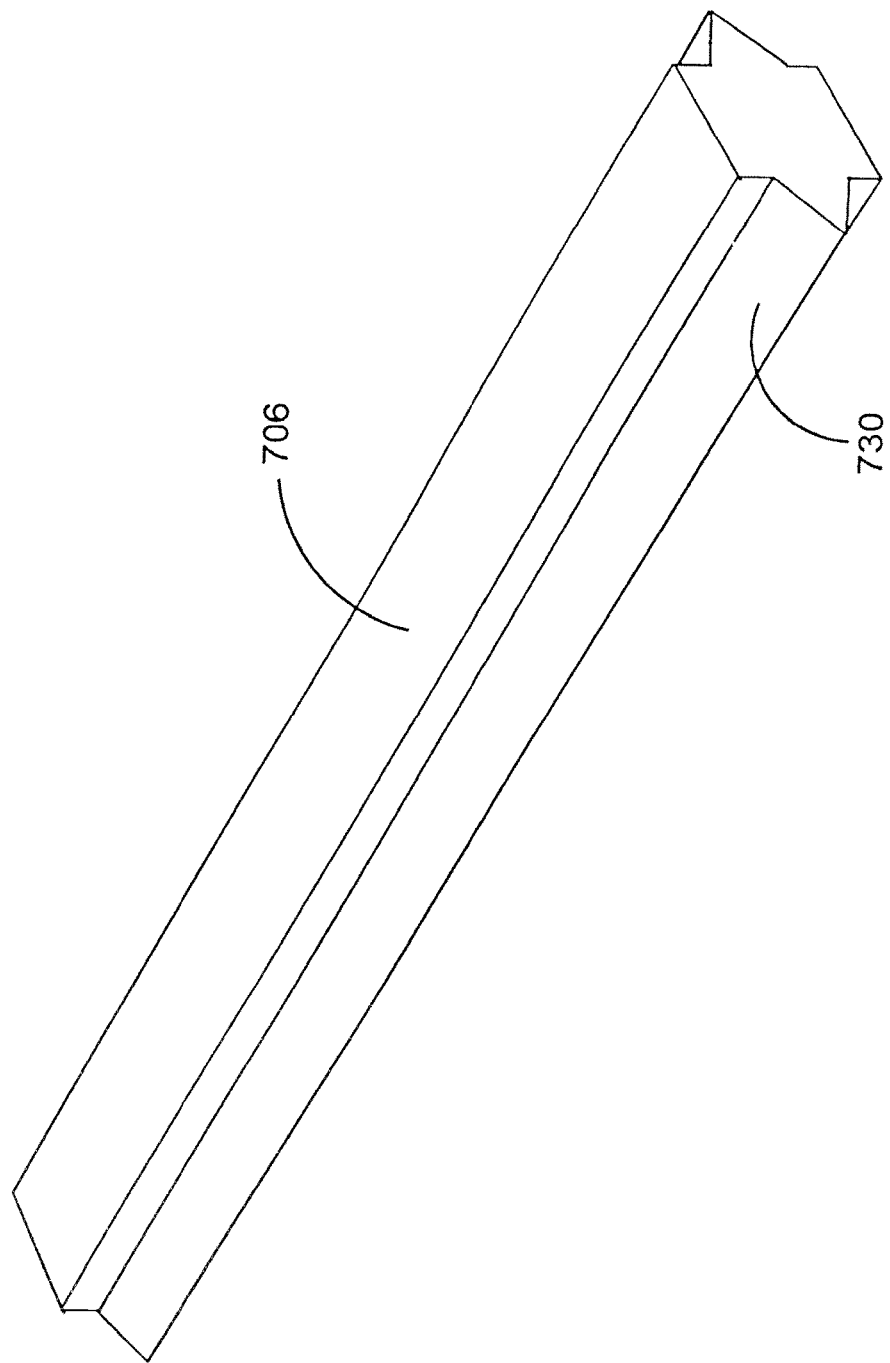

Referring to FIG. 7, in a further embodiment the pole pieces 706 are the same as those 606 of FIG. 6, being of constant cross section along their length, but instead of having parallel inner and outer surfaces, the retaining portions 730 are tapered towards their outer edges.

Figure 8:
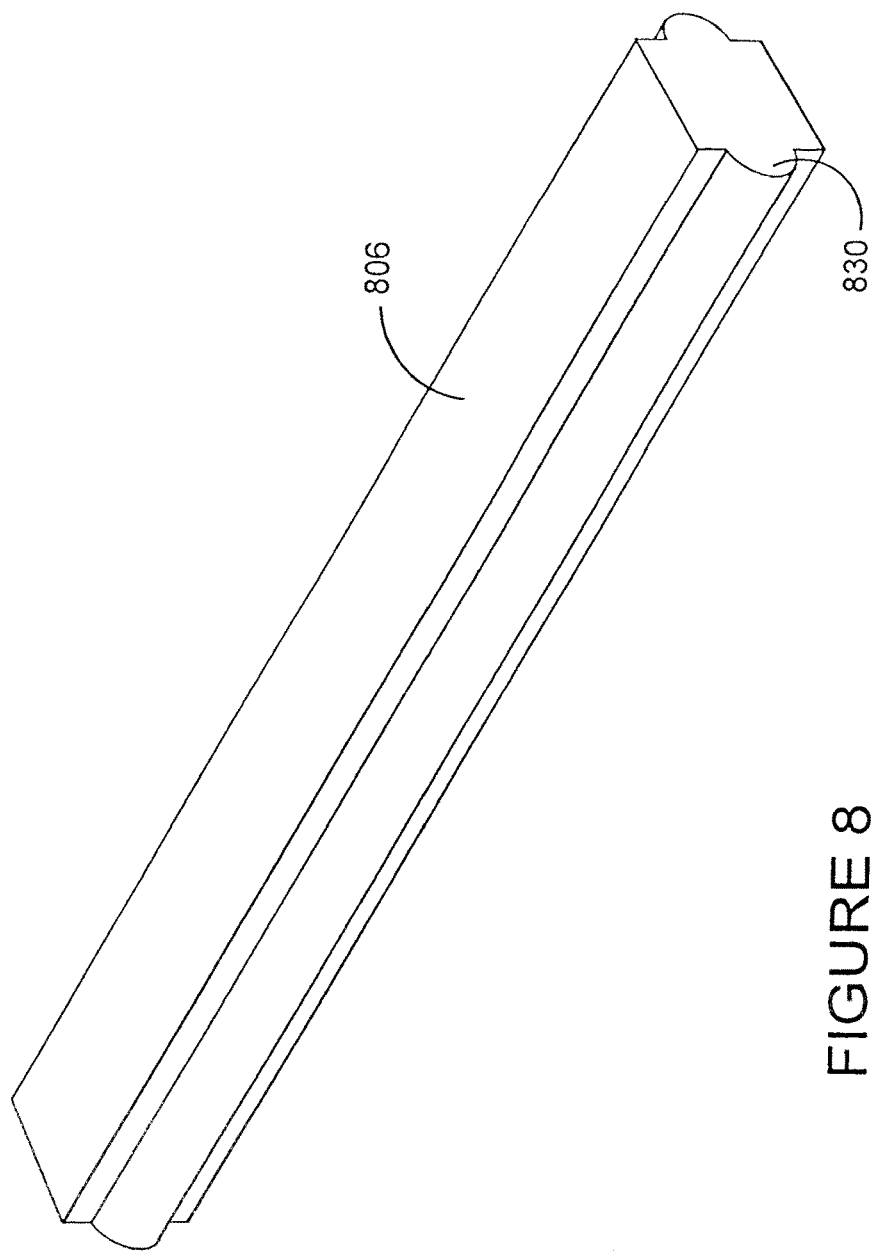

Referring to FIG. 8, in a further embodiment the pole pieces 806 are the same as those in FIG. 7, except that the retaining portions 830 are of semi-circular 5 rather than rectangular cross section.

Figure 9:
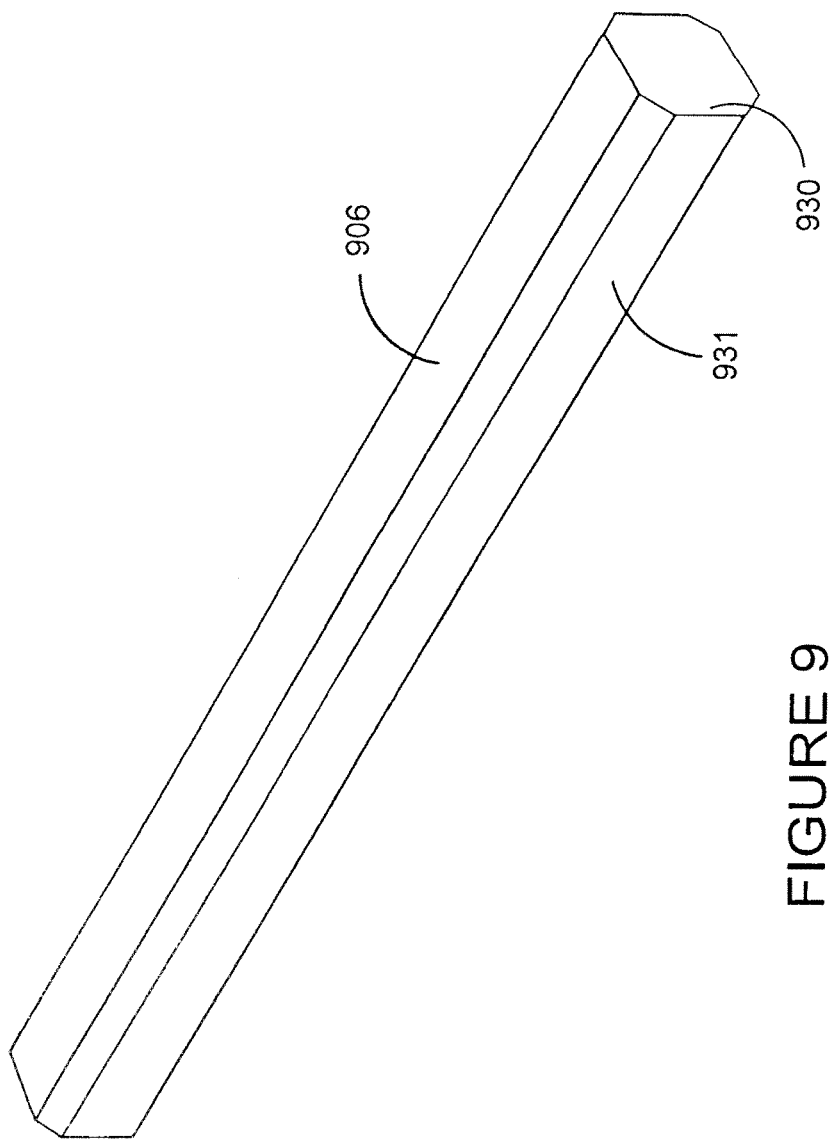
Figure 12:
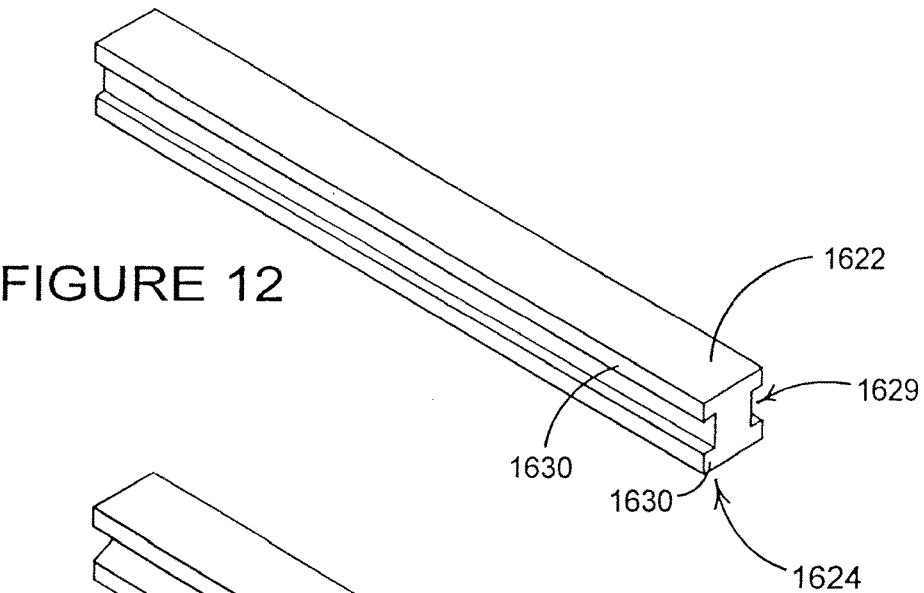
Figure 13:
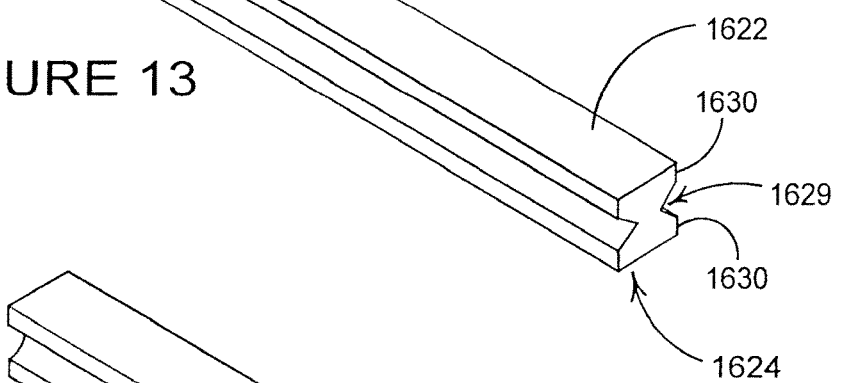
Figure 14:
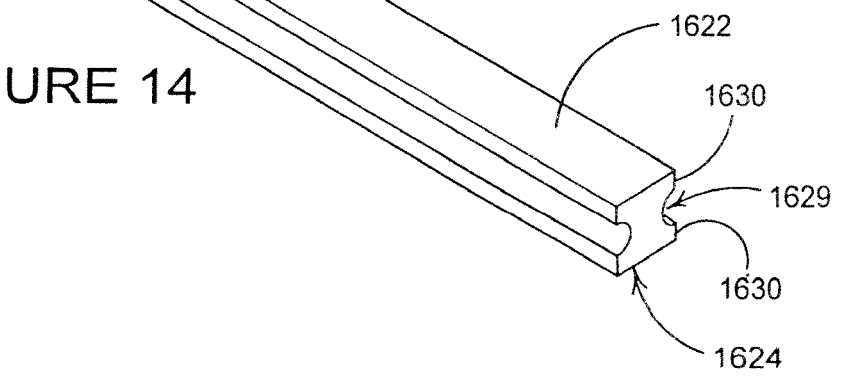
Figure 15:
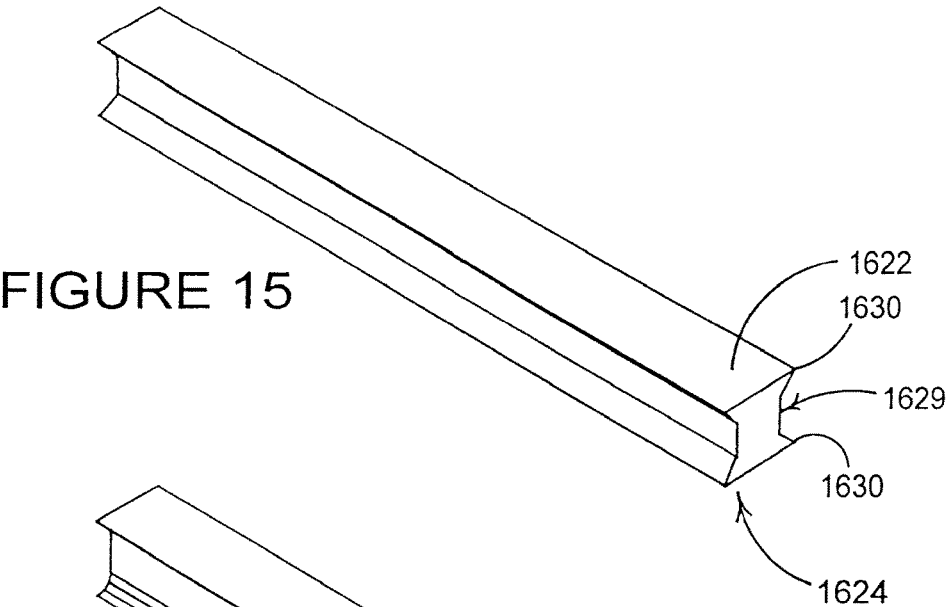
Figure 16:

Referring to FIG. 9, in a further embodiment, the pole pieces 906 are again similar with retaining portions 930 which are tapered towards their either edge, but truncated so that they have a surface 931 at the outer edge which is in a radial plane (relative to the rotor).

Referring to FIG. 10, in a further embodiment, the pole pieces 1006 are again similar, with retaining portions 1030 which are again tapered towards their outer edges and end in a radially orientated surface 1031, but in this case the inner and outer surfaces of the retaining portions are curved in a smooth radius rather than flat. Referring to FIG. 11, in a further embodiment the pole pieces 1106 are shaped the same as those of FIG. 3*a*, but they are laminated, being formed from a number of sheets or laminations 1106*a*, 1106*b* which lie in parallel planes which are radial (or substantially so) in relation to the rotor. Because the pole pieces 1106 are of constant cross section in the circumferential direction of the rotor, all of the laminations 1106*a*, 1106*b* are the same shape, which simplifies manufacture. It will be appreciated that the same lamination method could be used for any shape of pole piece that is of constant cross section in the circumferential direction of the rotor. For pole pieces that are of constant cross section in the axial direction, lamination is possible, but clearly this will affect the stiffness and strength of the pole pieces, and hence the rotor in which they are embedded, in the radial direction and circumferential directions.

Referring to FIGS. 12 to 16 in further embodiments the pole pieces have flat surfaces 1622, 1624 on their radially inner and outer sides, with channels 1629 of various shapes formed in their circumferentially facing sides. This means that there are two retaining portions 1630 extending along each side of the pole pieces, one on each side of each channel.

Figure 17:
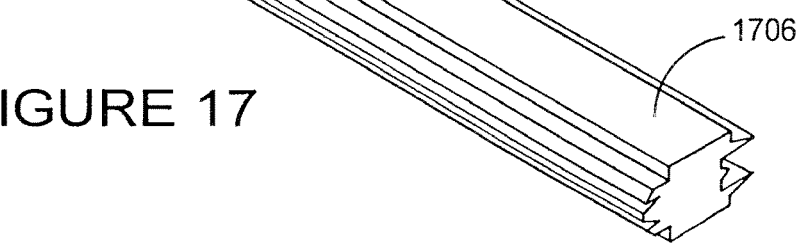

Referring to FIG. 17 in a further embodiment, the pole pieces 1706 have a number of different sized and shaped ridges and grooves extending along their circumferentially facing sides forming a number of retaining portions on each side. The shape shown is a more complex example of a possible shape for the pole pieces and illustrates the fact that a large number of different sizes and shapes and numbers of retaining portions can be provided on any particular pole piece.

Figure 18:
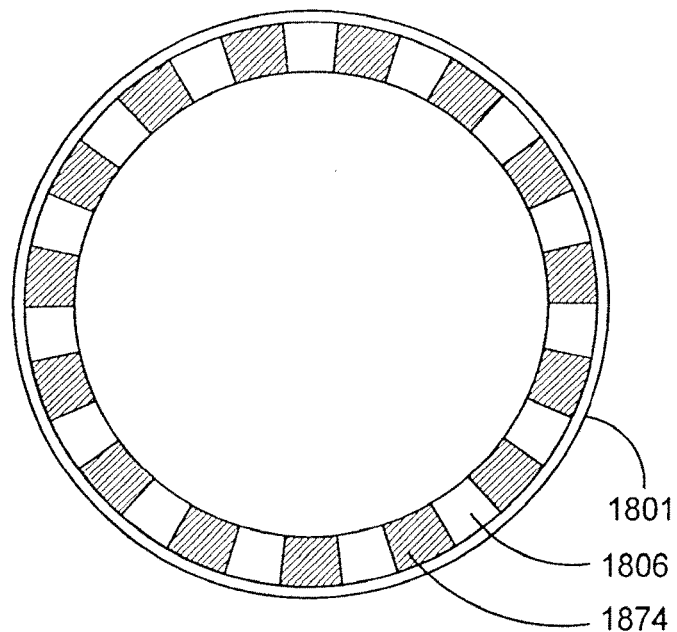
FIG. 18 is a section through a pole piece assembly of a coupling according to a further embodiment of the invention.

Referring to FIG. 18, in a further embodiment, the retaining portions, which are not shown in this figure, are supplemented by a wrapping 1801 around the outside of the pole pieces 1806 and moulded support 1874. The wrapping 1801 can be made of wire or sheet metal or fibre material. This arrangement can be used with any of the pole piece designs described above.

Figure 19:
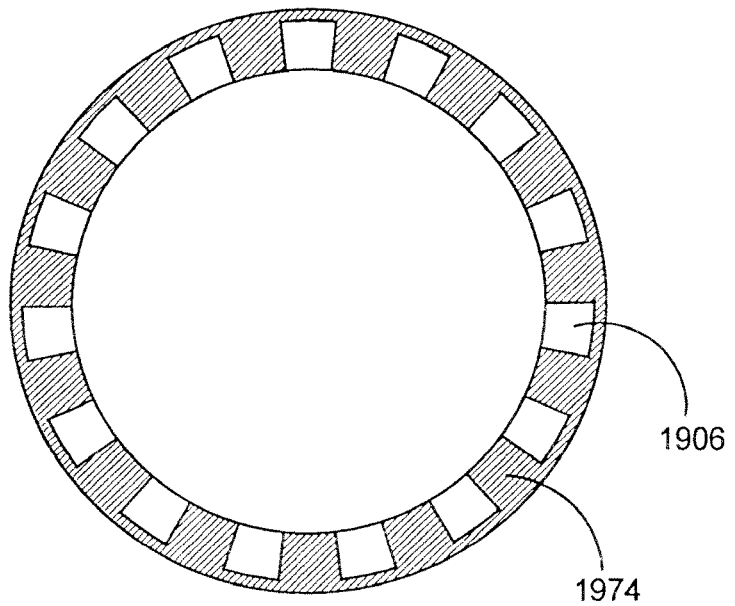
FIG. 19 is a section through a pole piece assembly of a coupling according to a 15 further embodiment of the invention.

Referring to FIG. 19 in a further embodiment the moulded support 1974 extends over the radially outer sides of the pole pieces 1906, but not over the radially inner sides of the pole pieces which are therefore exposed. Again, this arrangement can be used with any of the pole piece designs described above.

Figure 20:
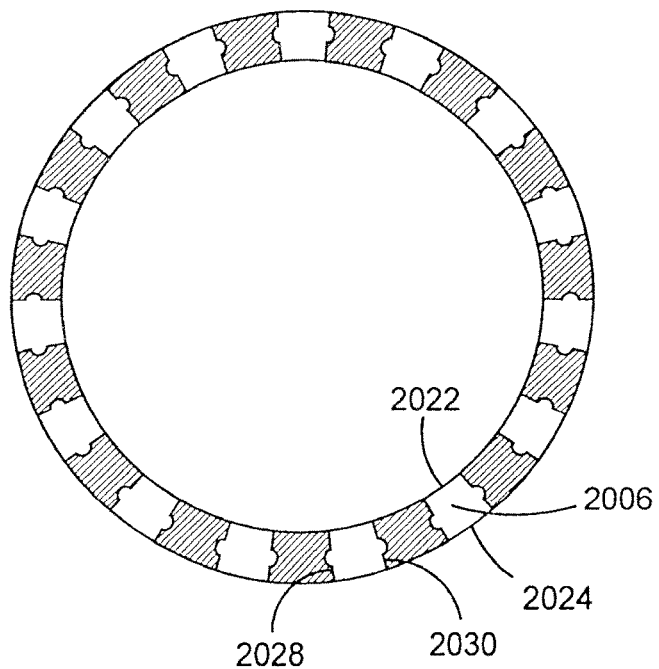
FIG. 20 is a section through a pole piece assembly of a coupling according to a further embodiment of the invention.
Figure 21:
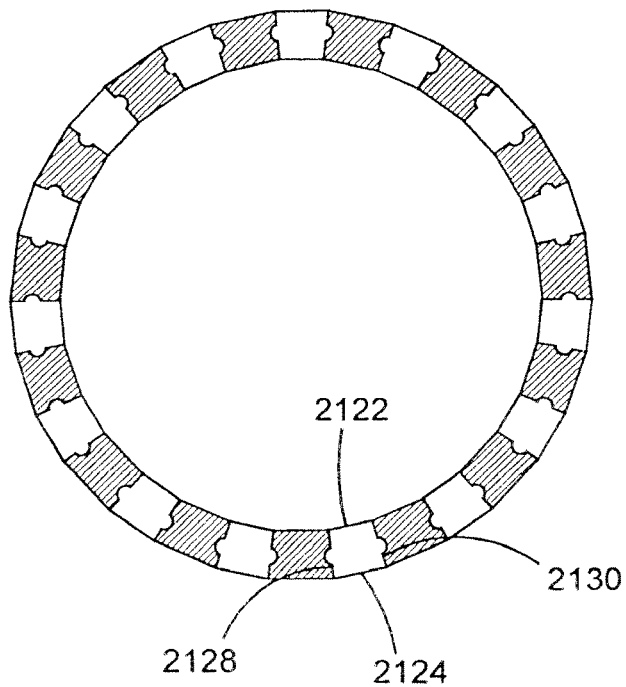
FIG. 21 is a section through a pole piece assembly of a coupling according to a further embodiment of the invention.

Referring to FIG. 20, in a further embodiment the pole pieces 2006 have the same cross section as those of FIG. 8 except that the circumferentially facing sides 2028, 2030 of the pole pieces are not parallel to each other, but arranged to lie in respective radial planes. The pole pieces are therefore tapered slightly in the radial direction. The radially inner and outer surfaces 2022, 2024 of the pole pieces 2006 are curved so that the radially inner and outer surfaces of the pole piece assembly are smoothly and continuously curved. In contrast, in the embodiment of FIG. 21 the circumferentially facing sides 2128, 2130 of the pole pieces are parallel to each other and the radially inner and outer surfaces 2122, 2124 are flat, so that the inner and outer surfaces of the pole piece assembly are formed of a number of flat sections. Clearly either of these arrangements can be used with any of the pole pieces described above.

Figure 22:
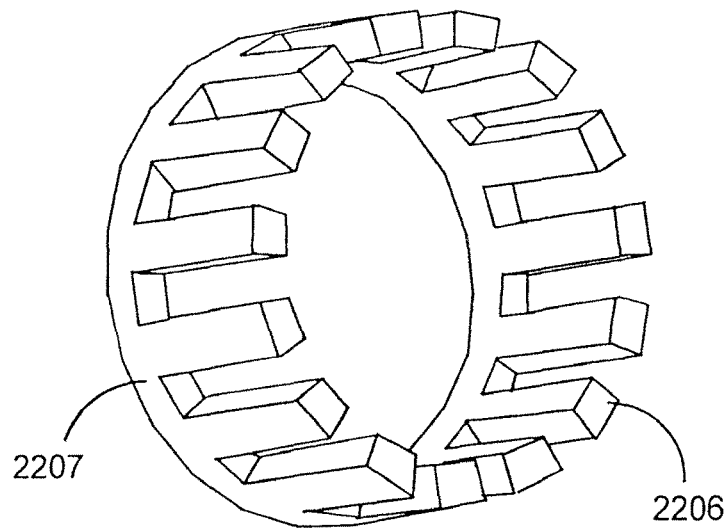
FIG. 22 is a perspective view of part of a pole piece assembly of a coupling according to a further embodiment of the invention.

Referring to FIG. 22, in a further embodiment the pole pieces 2206 are all formed integrally as a single piece casting together with an annular end support in the form of a support ring 2207. The end support 2207 is connected to one axial end of all of the pole pieces 2006 so that together they form a single stiff structure. In this embodiment the pole pieces 2206 and support ring 2207 are formed of the same material. However in a modification to this embodiment, the support ring is made of a non-magnetic material, preferably a non-magnetic metal such as aluminum. In this case the pole pieces 2206 can be fixed to the support ring 2007, for example by welding. The pole pieces and support ring 2207 are then moulded into a plastics support structure similar to that of FIG. 3.

It will be appreciated that the end support 2207 will support the pole pieces and help to prevent their movement. The pole pieces 2006 can be formed with retention portions as in any of the embodiments of FIGS. 3 to 17 which cooperate with the plastics support structure to provide further support. Alternatively the retention portions can be omitted and the end support 2007 used as the main means of support for the pole pieces. In this case it may be desirable to include a further end support at the other axial end of the pole pieces.

Figure 23:
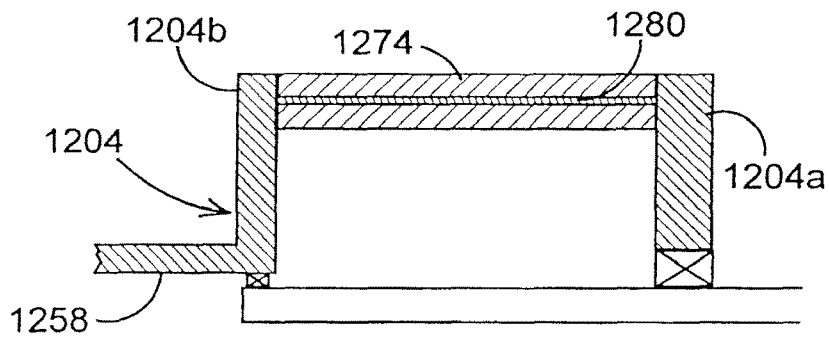
FIG. 23 is a partial longitudinal section through a rotor of a coupling according to a further embodiment of the invention.
Figure 24:
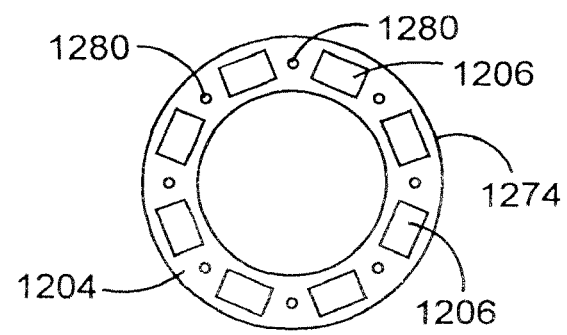
FIG. 24 is a transverse section through the rotor of FIG. 12.

Referring to FIGS. 23 and 24 in a further embodiment of the invention a coupling is similar to that of FIG. 4 with the output rotor 1204 supporting the pole pieces 1206. The shape of the output rotor 1204 is very similar to that of FIG. 4, but it is formed from an annular metal end support plate 1204a at the input end of the coupling, and a further annular metal support plate 1204b at the output end of the coupling, which is integral with the hollow output shaft 1258. The cylindrical support portion 1274 is of moulded plastics and extends between the two end supports 1204a, 1204b. The ferromagnetic pole pieces 1206 are embedded in the cylindrical plastics support section 1274, and spaced from the two end support plates 1204a, 1204b so that they are electrically isolated from them. A plurality of metal stiffening bars 1280 also extend axially along the cylindrical support portion 1274, being connected to the two end support plates 1204a, 1204b at their axial ends. The stiffening bars in this case are substantially central between the radially inner and outer surfaces of the cylindrical support section 1274, but they can be located at any radial position within, or against, the cylindrical support portion 1274.

As can be seen from FIG. 24 the stiffening bars 1280 extend in the axial direction parallel to, but spaced from, the pole pieces 1206, so that they are also electrically isolated from the pole pieces. This enables the stiffening bars 1280 to add significantly to the torsional stiffness of the rotor 1204 which helps to ensure accurate location of the pole pieces 1206. This is important in maximizing the efficiency of the coupling.

It will be appreciated that this structure of the cylindrical support for the pole pieces can also be used in a coupling as shown in FIG. 3. In this case the cylindrical support is fixed and not one of the rotors of the coupling.

The invention claimed is:

1. A magnetic drive system comprising three members, a first and second of which form a higher speed rotor and a lower speed rotor, respectively, each arranged to rotate about a common axis relative to a third member, wherein the first and second members have respective sets of permanent magnets, the first and second members having different numbers of magnetic poles, and the third member comprises:

a cylindrical body having a plurality of pole pieces embedded therein, the pole pieces each including a main portion and a retaining portion, each of the main portion and the retaining portion having radially inner and outer surfaces, wherein the cylindrical body defines a first radial thickness that is measured along a first line that extends perpendicular to the common axis through the retaining portion, the first radial thickness measured in a single radial direction from the common axis and the first radial thickness being a thickness of the pole piece along the first line subtracted from a thickness of the cylindrical body along the first line, the first radial thickness being greater than a second radial thickness measured along a second line that extends parallel to the first line and perpendicular to the common axis through the main portion, the second radial thickness measured in a single radial direction from the common axis and the second radial thickness being a thickness of the pole piece along the second line subtracted from a thickness of the cylindrical body along the second line, the pole pieces being arranged to modulate the magnetic field acting between the magnets, and a support connected to the pole pieces, wherein the retaining portion of at least one of the pole pieces is completely enclosed within the cylindrical body, wherein the cylindrical body has a number of pole pieces that is equal to the sum of the number of pole-pairs of the first member and the number of pole-pairs of the second member and wherein the pole pieces consist essentially of ferromagnetic material.

2. A system according to claim 1 wherein the support is substantially annular.

3. A system according to claim 1 wherein the support is connected to one end of each of the pole pieces.

4. A system according to claim 1 wherein the support is formed of the same material as the pole pieces.

5. A system according to claim 1 wherein the support is fixed to the pole pieces.

6. A system according to claim 1 wherein the support is of non-magnetic material.

7. A system according to claim 1 wherein the enclosure of the at least one of the radially inner and outer surfaces of the retaining portion is achieved by embedding the pole pieces within a moulded material.

8. A system according to claim 7 wherein the moulded material is a pre-formed cast.

9. A system according to claim 7 wherein the moulded material is an overmould and the enclosure of the at least one of the radially inner and outer surfaces of the retaining portion is achieved by moulding the overmould over or around the pole pieces.

10. A system according to claim 1 wherein the pole pieces are formed integrally as a single piece structure.

11. A system according to claim 10 wherein the structure is a single piece casting.

12. A system according to claim 1 wherein the three members are coaxial members about the common axis and the pole pieces are arranged to modulate the magnetic field acting between the magnets so that rotation of the input member induces rotation of the output member in a geared manner.

13. A system according to claim 1, wherein the pole pieces are embedded in and supported by a cylindrical plastic.

14. A system according to claim 1, wherein the pole pieces are embedded in and supported by a cylindrical plastic that is concentric with the first and second members.

15. A magnetic drive system comprising three members, a first and second of which form a higher speed rotor and a lower speed rotor, respectively, each arranged to rotate relative to a third member, wherein the first and second members have respective sets of permanent magnets, the first and second members having different numbers of magnetic poles, and the third member comprises a cylindrical body having a plurality of pole pieces embedded therein, the pole pieces each including a main portion and a retaining portion, each of the main portion and the retaining portion having radially inner and outer surfaces, wherein the cylindrical body defines a first radial thickness that is measured along a first line that extends perpendicular to the common axis through the retaining portion, the first radial thickness measured in a single radial direction from the common axis and the first radial thickness being a thickness of the pole piece along the first line subtracted from a thickness of the cylindrical body along the first line, the first radial thickness being greater than a second radial thickness measured along a second line that extends parallel to the first line and perpendicular to the common axis through the main portion, the second radial thickness measured in a single radial direction from the common axis and the second radial thickness being a thickness of the pole piece along the second line subtracted from a thickness of the cylindrical body along the second line, the pole pieces being arranged to modulate the magnetic field acting between the magnets, wherein the retaining portion of at least one of the pole pieces is completely enclosed within the cylindrical body and wherein one of the pole pieces is of varying radial thickness,
wherein the cylindrical body has a number of pole pieces that is equal to the sum of the number of pole-pairs of the first member and the number of pole-pairs of the second member and wherein the pole pieces consist essentially of ferromagnetic material.

16. A drive system according to claim 15 wherein the retaining portion of at least one of the pole pieces is narrower in the radial direction than the main portion.

17. A drive system according to claim 16 wherein the distance in the radial direction between the radially inner and outer surfaces of the retaining portion is less than the distance in the radial direction between the radially inner and outer surfaces of the main portion for each of the plurality of pole pieces.

18. A drive system according to claim 17 wherein the radially inner and outer surfaces of the main portion are mutually parallel.

19. A drive system according to claim 17 wherein the radially inner and outer surfaces of the retaining portion are mutually parallel.

20. A drive system according to claim 17 wherein the radially inner and outer surfaces of the retaining portion are non-parallel and the retaining portion tapers in a direction away from the main portion.

21. A drive system according to claim 15 wherein the pole piece is of constant cross section in one direction.

22. A drive system according to claim 21 wherein the pole piece is laminar being formed from a plurality of sheets all of the same shape.

23. A drive system according to claim 22 wherein the laminar lie in parallel planes which are orientated substantially transverse to the direction of rotation of the pole piece.

24. A drive system according to claim 22 wherein the laminar lie in parallel planes which are orientated substantially parallel to the direction of rotation of the pole piece.

25. A system according to claim 15 wherein the three members are coaxial members about the common axis and the pole pieces are arranged to modulate the magnetic field acting between the magnets so that rotation of the input member induces rotation of the output member in a geared manner.

26. A system according to claim 15, wherein the pole pieces are embedded in and supported by a cylindrical plastic.

27. A system according to claim 15, wherein the pole pieces are embedded in and supported by a cylindrical plastic that is concentric with the first and second members.

28. A magnetic drive system comprising three members, a first and second of which form a higher speed rotor and a lower speed rotor, respectively, each arranged to rotate relative to a third member, wherein the first and second members have respective sets of permanent magnets, the first and second members having different numbers of magnetic poles, and the third member comprises a cylindrical body having a plurality of pole pieces embedded therein, the pole pieces each including a main portion and a retaining portion, each of the main portion and the retaining portion having radially inner and outer surfaces, wherein the cylindrical body defines a first radial thickness measured along a first line that extends perpendicular to the common axis through the retaining portion, the first radial thickness measured in a single radial direction from the common axis and the first radial thickness being a thickness of the pole piece along the first line subtracted from a thickness of the cylindrical body along the first line, the first radial thickness being greater than a second radial thickness measured along a second line that extends parallel to the first line and perpendicular to the common axis through the main portion, the second radial thickness measured in a single radial direction from the common axis and the second radial thickness being a thickness of the pole piece along the second line subtracted from a thickness of the cylindrical body along the second line, the pole pieces being arranged to modulate the magnetic field acting between the magnets, an end support at each end of the cylindrical body, and a plurality of stiffening bars extending axially along the cylindrical body between the end supports, wherein the retaining portion of at least one of the pole pieces is completely enclosed within the cylindrical body, and wherein the cylindrical body has a number of pole pieces that is equal to the sum of the number of pole-pairs of the first member and the number of pole-pairs of the second member and wherein the pole pieces consist essentially of ferromagnetic material.

29. A system according to claim 28 wherein the end supports are metal.

30. A system according to claim 28 wherein the pole pieces are spaced from the end supports.

31. A system according to claim 28 wherein the pole pieces are spaced from the stiffening bars.

32. A system according to claim 28 wherein the three members are coaxial members about the common axis and the pole pieces are arranged to modulate the magnetic field acting between the magnets so that rotation of the input member induces rotation of the output member in a geared manner.

33. A system according to claim 28, wherein the pole pieces are embedded in and supported by a cylindrical plastic.

34. A system according to claim 28, wherein the pole pieces are embedded in and supported by a cylindrical plastic that is concentric with the first and second members.

* * * * *